United States Patent
Hamner et al.

(10) Patent No.: US 11,407,559 B2
(45) Date of Patent: *Aug. 9, 2022

(54) PIPE COIL SKID WITH SIDE RAILS AND METHOD OF USE

(71) Applicant: TRINITY BAY EQUIPMENT HOLDINGS, LLC, Houston, TX (US)

(72) Inventors: Brett Hamner, Seabrook, TX (US); Max Reedy, LaPorte, TX (US); Alexander Lee Winn, Spring, TX (US); Peter Parker, Beech Creek, PA (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/965,993

(22) PCT Filed: Feb. 1, 2019

(86) PCT No.: PCT/US2019/016250
§ 371 (c)(1),
(2) Date: Jul. 29, 2020

(87) PCT Pub. No.: WO2019/152779
PCT Pub. Date: Aug. 8, 2019

(65) Prior Publication Data
US 2021/0032011 A1    Feb. 4, 2021

Related U.S. Application Data

(60) Provisional application No. 62/625,160, filed on Feb. 1, 2018.

(51) Int. Cl.
*B65D 19/44*    (2006.01)
*B65H 75/02*    (2006.01)
(Continued)

(52) U.S. Cl.
CPC .............. *B65D 19/44* (2013.01); *B61D 45/00* (2013.01); *B65D 19/0048* (2013.01);
(Continued)

(58) Field of Classification Search
CPC ........ B65D 19/44; B65D 85/04; B61D 45/00; B65H 75/02
(Continued)

(56) References Cited

U.S. PATENT DOCUMENTS 2,994,500 A    8/1961  Fraser et al.
3,084,803 A *  4/1963  Bayers ................ A47B 81/007
                                              211/85.5
(Continued)

FOREIGN PATENT DOCUMENTS

AU    2017288915    1/2018
AU    2014299014    1/2019
(Continued)

OTHER PUBLICATIONS

Ministry of Law and Human Rights Republic of Indoneisa; Office Action, issued in connection to application No. PID201810605; 4 pages; dated Sep. 9, 2020 Indonesia.
(Continued)

*Primary Examiner* — Jose V Chen
(74) *Attorney, Agent, or Firm* — Greenberg Traurig, LLP; Dwayne L. Mason; Mark G. Chretien

(57) ABSTRACT

A pipe coil skid includes a plurality of beams affixably connected together to form a rectangular shaped base and a platform disposed within the base. The platform has a concave upward shape on its upward facing side when the skid sits on a horizontal surface, such that a coil of pipe positioned upon the platform contacts the platform within the base. The pipe coil skid also includes a first side rail coupled to at least one of the plurality of beams. The first
(Continued)

side rail is configured to block movement of the coil of pipe beyond a boundary of the rectangular shaped base.

20 Claims, 13 Drawing Sheets

(51) Int. Cl.
*B65D 85/04* (2006.01)
*B65D 19/00* (2006.01)
*B61D 45/00* (2006.01)
*B60P 7/08* (2006.01)

(52) U.S. Cl.
CPC ............ *B65D 85/04* (2013.01); *B65H 75/02* (2013.01); *B60P 7/0823* (2013.01); *B61D 45/001* (2013.01); *B65D 2519/00024* (2013.01); *B65D 2519/00059* (2013.01); *B65D 2519/0081* (2013.01); *B65D 2519/00129* (2013.01); *B65D 2519/00273* (2013.01); *B65D 2519/00288* (2013.01); *B65D 2519/00323* (2013.01); *B65D 2519/00333* (2013.01); *B65D 2519/00437* (2013.01); *B65D 2519/00562* (2013.01); *B65D 2519/00796* (2013.01); *B65D 2519/00815* (2013.01); *B65H 2701/33* (2013.01)

(58) Field of Classification Search
USPC ...................... 108/55.1, 55.3, 55.5
See application file for complete search history.

(56) References Cited

U.S. PATENT DOCUMENTS

| | | | | |
|---|---|---|---|---|
| 3,502,205 A * | 3/1970 | Milton | ............... | B65D 88/005 |
| | | | | 206/386 |
| 3,715,993 A | 2/1973 | Orlik | | |
| 3,753,407 A * | 8/1973 | Tilseth | ................. | B65D 19/44 |
| | | | | 108/53.3 |
| 3,857,494 A * | 12/1974 | Giardini | ................ | B65D 19/08 |
| | | | | 211/194 |
| 4,732,528 A * | 3/1988 | Good | ..................... | B65D 19/44 |
| | | | | 108/53.1 |
| 4,976,365 A | 12/1990 | Seo | | |
| 5,036,979 A | 8/1991 | Selz | | |
| 5,076,745 A | 12/1991 | Klein | | |
| 5,184,743 A | 2/1993 | Suzuki et al. | | |
| 5,228,821 A | 7/1993 | Gleffe et al. | | |
| 5,343,813 A | 9/1994 | Septer | | |
| 5,355,813 A | 10/1994 | Darnell et al. | | |
| 5,515,977 A * | 5/1996 | Lambert | ............... | B65D 19/44 |
| | | | | 206/395 |
| 5,588,372 A | 12/1996 | Kelly | | |
| 5,609,111 A | 3/1997 | Hasegawa et al. | | |
| 5,833,289 A | 11/1998 | Brolin | | |
| 5,931,435 A * | 8/1999 | Hoadley | ............... | B65D 19/44 |
| | | | | 248/346.03 |
| 6,202,569 B1 * | 3/2001 | Bailey | ................ | B65D 19/0026 |
| | | | | 108/53.5 |
| 6,231,284 B1 * | 5/2001 | Kordel | .................. | B65D 19/44 |
| | | | | 108/55.3 |
| 6,276,285 B1 * | 8/2001 | Ruch | ..................... | B65D 19/44 |
| | | | | 108/55.5 |
| 6,402,167 B1 * | 6/2002 | Calleja | .................. | B62B 3/006 |
| | | | | 108/55.1 |
| 6,419,424 B1 | 7/2002 | Null et al. | | |
| 6,494,397 B1 | 12/2002 | Myklebust | | |
| 6,602,032 B2 * | 8/2003 | Arai | ..................... | B65D 19/385 |
| | | | | 108/55.1 |
| 9,487,328 B2 * | 11/2016 | Edwards | ................ | B65D 19/44 |
| 9,580,236 B1 | 2/2017 | Skeid et al. | | |
| 10,190,722 B2 | 1/2019 | Espinasse et al. | | |
| 10,197,198 B2 | 2/2019 | Glejbol | | |
| 10,226,823 B2 | 3/2019 | Karpachevskyy | | |
| 10,226,892 B2 | 3/2019 | Kremers | | |
| 10,234,068 B2 | 3/2019 | Varagnolo et al. | | |
| 10,281,065 B2 | 5/2019 | Secher et al. | | |
| 10,285,223 B2 | 5/2019 | Hatton et al. | | |
| 10,288,207 B2 | 5/2019 | Littlestar et al. | | |
| 10,378,682 B2 | 8/2019 | Cloos et al. | | |
| 10,408,795 B2 | 9/2019 | Nicolas et al. | | |
| 10,415,731 B2 | 9/2019 | Boche et al. | | |
| 10,429,267 B2 | 10/2019 | Grimsley | | |
| 10,436,667 B2 | 10/2019 | Littlestar et al. | | |
| 10,442,925 B2 | 10/2019 | Rong et al. | | |
| 10,451,206 B2 | 10/2019 | Espinasse et al. | | |
| 10,471,661 B2 | 11/2019 | Boczkowski et al. | | |
| 10,480,054 B2 | 11/2019 | Valdez et al. | | |
| 10,487,965 B2 | 11/2019 | Bouey et al. | | |
| 10,494,519 B2 | 12/2019 | Wilson et al. | | |
| 10,513,896 B2 | 12/2019 | Gudme et al. | | |
| 10,526,313 B2 | 1/2020 | Rosen et al. | | |
| 10,527,198 B2 | 1/2020 | Nicolson et al. | | |
| 10,544,889 B2 | 1/2020 | Bouey et al. | | |
| 10,544,892 B2 | 1/2020 | Holst | | |
| 2003/0071160 A1 | 4/2003 | Cain et al. | | |
| 2004/0195127 A1 | 10/2004 | Beck | | |
| 2005/0247828 A1 | 11/2005 | Tzur et al. | | |
| 2007/0193912 A1 | 8/2007 | Shiraki et al. | | |
| 2007/0210199 A1 | 9/2007 | Shampine et al. | | |
| 2011/0057067 A1 | 3/2011 | Aaland et al. | | |
| 2011/0192760 A1 | 8/2011 | Joubert | | |
| 2011/0303129 A1 * | 12/2011 | Harris | ................. | A47B 87/0215 |
| | | | | 108/53.1 |
| 2015/0082753 A1 * | 3/2015 | Fuller | ..................... | B02C 15/00 |
| | | | | 53/473 |
| 2015/0197369 A1 | 7/2015 | Amano et al. | | |
| 2015/0314961 A1 * | 11/2015 | Marler | ..................... | B65G 1/10 |
| | | | | 248/188.9 |
| 2018/0201176 A1 * | 7/2018 | Reedy | ..................... | B63B 25/28 |
| 2019/0003921 A1 | 1/2019 | Nicholas | | |
| 2019/0024830 A1 | 1/2019 | Glejbol | | |
| 2019/0094101 A1 | 3/2019 | Spiegel et al. | | |
| 2019/0101233 A1 | 4/2019 | Hatton et al. | | |
| 2019/0126567 A1 | 5/2019 | Bornemann et al. | | |
| 2019/0154186 A1 | 5/2019 | Varagnolo et al. | | |
| 2019/0161269 A1 | 5/2019 | Hamner | | |
| 2019/0162334 A1 | 5/2019 | Westhoff et al. | | |
| 2019/0162335 A1 | 5/2019 | Yu et al. | | |
| 2019/0162336 A1 | 5/2019 | Andersen et al. | | |
| 2019/0186656 A1 | 6/2019 | Kozak et al. | | |
| 2019/0194440 A1 | 6/2019 | Rong et al. | | |
| 2019/0217337 A1 | 7/2019 | Gujare et al. | | |
| 2019/0219473 A1 | 7/2019 | Littlestar et al. | | |
| 2019/0233163 A1 | 8/2019 | Hamner | | |
| 2019/0241353 A1 | 8/2019 | Reedy | | |
| 2019/0242501 A1 | 8/2019 | Bereczkne et al. | | |
| 2019/0257448 A1 | 8/2019 | Chalmers et al. | | |
| 2019/0285199 A1 | 9/2019 | Nicolson et al. | | |
| 2019/0309582 A1 | 10/2019 | Procida | | |
| 2019/0338868 A1 | 11/2019 | Hjorth | | |
| 2019/0368967 A1 | 12/2019 | Grimsley | | |
| 2019/0391097 A1 | 12/2019 | Nicolas et al. | | |
| 2020/0011467 A1 | 1/2020 | Holst | | |
| 2020/0361700 A1 * | 11/2020 | Harder | ............... | G06K 17/0022 |

FOREIGN PATENT DOCUMENTS

| | | |
|---|---|---|
| AU | 2014363465 | 1/2019 |
| AU | 2017302735 | 1/2019 |
| AU | 2014310509 | 3/2019 |
| AU | 2017319390 | 3/2019 |
| AU | 2017347152 | 5/2019 |
| AU | 2017365730 | 6/2019 |
| AU | 2018211384 | 8/2019 |
| AU | 2018222217 | 8/2019 |
| AU | 2015335367 | 10/2019 |
| AU | 2015345613 | 10/2019 |
| AU | 2018288000 | 1/2020 |
| AU | 2019279941 | 1/2020 |
| BR | 112014017998 | 1/2019 |
| BR | 112018013586 | 1/2019 |

(56) References Cited

FOREIGN PATENT DOCUMENTS

| | | |
|---|---|---|
| BR | PI0810573 | 1/2019 |
| BR | PI0819542 | 1/2019 |
| BR | 112019001414 | 2/2019 |
| BR | 112018075840 | 3/2019 |
| BR | 112019004048 | 3/2019 |
| BR | PI0517181 | 3/2019 |
| BR | 112019000076 | 4/2019 |
| BR | 112019007789 | 4/2019 |
| BR | PI0914836 | 4/2019 |
| BR | 112019003669 | 5/2019 |
| BR | 112019005154 | 6/2019 |
| BR | 112013032388 | 7/2019 |
| BR | 112019013850 | 7/2019 |
| BR | PI0720487 | 8/2019 |
| BR | 112012015257 | 9/2019 |
| BR | 112013017957 | 9/2019 |
| BR | 112015027495 | 9/2019 |
| BR | 112016001932 | 9/2019 |
| BR | PI0909348 | 9/2019 |
| BR | 112015002088 | 10/2019 |
| BR | 112019020051 | 10/2019 |
| BR | 112012020776 | 11/2019 |
| BR | 112019012614 | 11/2019 |
| BR | PI0808956 | 11/2019 |
| BR | 112013028806 | 12/2019 |
| BR | 112013000428 | 1/2020 |
| BR | PI0924891 | 1/2020 |
| CA | 2214392 | 9/1996 |
| CA | 2148957 | 12/1996 |
| CA | 3029245 A1 * 1/2018 ............. B65D 19/44 |
| CA | 2859433 | 3/2019 |
| CA | 2823056 | 4/2019 |
| CA | 2765294 | 6/2019 |
| CA | 2854955 | 6/2019 |
| CA | 2835008 | 8/2019 |
| CA | 3012146 | 1/2020 |
| CN | 205113935 | 3/2016 |
| CN | 109153196 | 1/2019 |
| CN | 109153229 | 1/2019 |
| CN | 109562862 | 4/2019 |
| CN | 109958827 | 7/2019 |
| CN | 110177969 | 8/2019 |
| CN | 106985493 | 11/2019 |
| CN | 108291686 | 11/2019 |
| CN | 110461586 | 11/2019 |
| CN | 110462273 | 11/2019 |
| CN | 107250643 | 12/2019 |
| CN | 108291670 | 1/2020 |
| DE | 4008178 | 9/1991 |
| DE | 4136268 | 5/1993 |
| DE | 9312514 | 11/1993 |
| DE | 102018214615 | 6/2019 |
| DK | 3224393 T3 | 1/2019 |
| DK | 2820083 T3 | 2/2019 |
| DK | 2959199 T5 | 2/2019 |
| DK | 3228639 T3 | 2/2019 |
| DK | 2780159 T3 | 4/2019 |
| DK | 3196523 T3 | 4/2019 |
| DK | 2516534 | 7/2019 |
| DK | 2901062 T3 | 8/2019 |
| DK | 3286474 T3 | 9/2019 |
| EA | 201990156 | 5/2019 |
| EP | 174896 | 3/1986 |
| EP | 20070380017 | 3/2006 |
| EP | 1834898 | 9/2007 |
| EP | 62557 A1 * 3/2018 |
| EP | 2360406 | 1/2019 |
| EP | 2780159 | 1/2019 |
| EP | 3069063 | 1/2019 |
| EP | 3433523 | 1/2019 |
| EP | 3089846 | 2/2019 |
| EP | 3334969 | 2/2019 |
| EP | 3334970 | 2/2019 |
| EP | 3439871 | 2/2019 |
| EP | 2386894 | 3/2019 |
| EP | 2516534 | 3/2019 |
| EP | 2737238 | 3/2019 |
| EP | 2859173 | 3/2019 |
| EP | 3371502 | 3/2019 |
| EP | 3455059 | 3/2019 |
| EP | 3455536 | 3/2019 |
| EP | 3458531 | 3/2019 |
| EP | 2862700 | 4/2019 |
| EP | 3105484 | 4/2019 |
| EP | 3258155 | 4/2019 |
| EP | 3334965 | 4/2019 |
| EP | 3334967 | 4/2019 |
| EP | 3463849 | 4/2019 |
| EP | 3468725 | 4/2019 |
| EP | 3314155 | 5/2019 |
| EP | 3478594 | 5/2019 |
| EP | 3488135 | 5/2019 |
| EP | 2519764 | 6/2019 |
| EP | 2572134 | 7/2019 |
| EP | 2661578 | 7/2019 |
| EP | 3507535 | 7/2019 |
| EP | 3513108 | 7/2019 |
| EP | 2576333 | 8/2019 |
| EP | 3014157 | 8/2019 |
| EP | 3059481 | 8/2019 |
| EP | 3526437 | 8/2019 |
| EP | 2588787 | 9/2019 |
| EP | 2870397 | 9/2019 |
| EP | 3093546 | 10/2019 |
| EP | 3548280 | 10/2019 |
| EP | 3350498 | 12/2019 |
| EP | 3482112 | 12/2019 |
| EP | 3583344 | 12/2019 |
| EP | 3716288 A1 * 9/2020 ............... G21F 5/14 |
| FR | 3068104 | 7/2019 |
| FR | 3077997 | 8/2019 |
| FR | 3074251 | 12/2019 |
| FR | 3076337 | 1/2020 |
| GB | 2238294 | 5/1991 |
| GB | 2435875 | 9/2007 |
| GB | 2503880 | 3/2019 |
| GB | 2562674 | 3/2019 |
| GB | 2557571 | 9/2019 |
| GB | 2572120 | 9/2019 |
| GB | 2520756 | 10/2019 |
| GB | 2535925 | 12/2019 |
| GB | 2574296 | 12/2019 |
| HU | E045956 T2 | 1/2020 |
| IN | 201817046036 | 2/2019 |
| IN | 330637 | 1/2020 |
| JP | 2006021784 | 1/2006 |
| JP | 4048238 | 12/2007 |
| KR | 20110000785 | 1/2011 |
| PL | 2678216 T3 | 2/2019 |
| PL | 2379299 T3 | 5/2019 |
| RU | 2018113428 | 10/2019 |
| WO | 2011/001183 | 1/2011 |
| WO | WO-2016115937 A1 * 7/2016 ............. B65D 19/44 |
| WO | 2018/005299 | 1/2018 |
| WO | 2019/016554 | 1/2019 |
| WO | 2019/016558 | 1/2019 |
| WO | 2019/073047 | 4/2019 |
| WO | 2019/022599 | 5/2019 |
| WO | 2019/099219 | 5/2019 |
| WO | 2019/105926 | 6/2019 |
| WO | 2019/112431 | 6/2019 |
| WO | 2019/120677 | 6/2019 |
| WO | 2019/141326 | 7/2019 |
| WO | 2019/152779 | 8/2019 |
| WO | 2019/165562 | 9/2019 |
| WO | 2019/197538 | 10/2019 |
| WO | 2019/207031 | 10/2019 |

(56) References Cited

FOREIGN PATENT DOCUMENTS

| WO | 2019/238456 | 12/2019 |
|---|---|---|
| WO | 2020/016325 | 1/2020 |

OTHER PUBLICATIONS

China National Intellectual Property Administration; Decision of Rejection, issued in connection to application No. 2017800395084; 12 pages; dated Nov. 4, 2020; China.
Canadian Intellectual Property Office; Examiner's Report, issuedin connection to application No. 3029245; dated Aug. 14, 2020; 4 pages; Canada.
Australian Government, IP Australia; Examination Report No. 1 for Standard Patent Application, issued in connection to AU2017288915; dated Apr. 4, 2019; 3 pages; Australia.
The International Bureau of WIPO; PCT International Preliminary Reporion Patentability, issued in connection with PCT/US2017/039104; dated Jan. 10, 2019; 6 pages; Switzerland.
United States Patent and Tradeamrk Office; PCT Written Opinion of the International Searching Authority, issued in connection to PCT/US2017/039104; dated Sep. 1, 2017; 5 pages; U.S.
United States Patent and Tradeamrk Office; PCT International Search Report, Issued in Connection to PCT/US2017/039104; dated Sep. 1, 2017; 2 pages; U.S.
United States Patent and Tradeamrk Office; PCT International Search Report, Issued in Connection to PCT/US19/16250; dated Apr. 22, 2019; 3 pages; U.S.
United States Patent and Tradeamrk Office; PCT Written Opinion of the International Searching Authority, issued in connection to PCT/US19/16250; dated Apr. 22, 2019; 8 pages; U.S.
China National Intellectual Property Administration; First Office Action, issued in connection to CN201780039508.4; dated Sep. 16, 2019; 13 pages; China.
The Eurasian Patent Organization; Official Notification, issued in connection with application No. 201990156/31; 4 pages; dated Oct. 29, 2019; Russia.
Iran Patent Office; Office Action, issued in connection to application No. 139750140003008390; 9 pages; Iran.
Canadian Intellectual Property Office; Examiner's Report, issuedin connection to application No. 3029245; dated Dec. 10, 2019; 4 pages; Canada.
European Patent Office; Extended European Search Report, issued in connection to application No. 17820985.4; 8 pages; dated Dec. 12, 2019; Europe.
Intellectual Property Office of Singapore; Invitation to Respond to Written Opinion, issued in connection to application No. 11201811024S; dated Feb. 7, 2020; 7 pages; Singapore.
Colombian Patent and Trademark Office; Office Action, issued in connection to application No. NC2018/0013829; dated May 20, 2020; 13 pages; Colombia.
Indian Patent Office; Examiner Report, issued in connection to application No. 201817046036; dated Jun. 1, 2020; 6 pages; India.
The Eurasian Patent Organization; Official Notification, issued in connection with application No. 201990156; 4 pages; dated Jun. 15, 2020; Russia.
China National Intellectual Property Administration; Second Office Action, issued in connection to CN2017800395084; dated Jun. 2, 2020; 10 pages; China.
Egyptian Patent Office; Official Decision, issued in connection to patent application No. PCT2093/2018; 6 pages; dated Jun. 2021; Egypt.
The Eurasian Patent Organization; Official Notification, issued in connection with application No. 202091764; 6 pages; dated Apr. 20, 2021; Russia.
European Patent Office; Communication Pursuant to Article 94(3) EPC, issued in connection to application No. 17820985.4; 4 pages; dated Jul. 2, 2021; Europe.
Saudi Authority for Intellectual Property; First Examination Report, issued in connection to application No. 518400756; dated Jun. 27, 2021; Saudi Arabia.
Colombian Patent and Trademark Office; Office Action, issued in connection to application No. NC2018/0013829; dated Mar. 25, 2021; 13 pages; Colombia.

* cited by examiner

PIPE COIL SKID WITH SIDE RAILS AND METHOD OF USE

CROSS-REFERENCE TO RELATED APPLICATIONS

This application claims the benefit, and priority benefit, of U.S. Provisional Application 62/625,160 filed Feb. 1, 2018, the disclosures of which are incorporated by reference herein in their entirety.

BACKGROUND

Flexible pipe is useful in a myriad of environments, including in the oil and gas industry. Flexible pipe may be durable and operational in harsh operating conditions and can accommodate high pressures and temperatures. Flexible pipe may be bundled and arranged into one or more coils to facilitate transporting and using the pipe.

Coils of pipe may be positioned in an "eye to the side" or "eye to the sky" orientation. When the flexible pipe is coiled and is disposed with its interior channel facing upwards, such that the coil is in a horizontal orientation, then the coils of pipe are referred to as being in an "eye to the sky" orientation. If, instead, the flexible pipe is coiled and disposed such that the interior channel is not facing upwards, such that the coil is in an upright or vertical orientation, then the coils of pipe are referred to as being in an "eye to the side" orientation.

The flexible pipe may be transported as coils to various sites for deployment (also referred to as uncoiling or unspooling). Different types of devices and vehicles are currently used for loading and transporting coils of pipe, but usually extra equipment and human manual labor is also involved in the process of loading or unloading such coils for transportation and/or deployment. Such coils of pipe are often quite large and heavy. Accordingly, there exists a need for an improved method and apparatus for loading, moving and unloading coils of pipe.

SUMMARY

Various nonlimiting embodiments provide methods and apparatuses for moving coils of flexible pipe using a pipe coil skid with side rails. A pipe coil skid includes a plurality of beams affixably connected together to form a rectangular shaped base with a platform disposed within the base, the platform having a concave upward shape on its upward facing side when the skid sits on a horizontal surface such that the coil of pipe positioned upon the platform contacts the platform within the base. In other aspects, the pipe coil skid has an upward facing side generally corresponding to the outer circumferential shape of a coil of pipe. The beams and the platform may be formed of a steel material. The platform may be coated with a non-stick material or a rubberized material. The pipe coil skid may have a plurality of tie-down points for securing the coil of pipe. The pipe coil skid may have stackable corners disposed on the skids to enable stacking of pipe coil skids. The pipe coil skid may include a first side rail coupled to at least one of the plurality of beams. The side rails may be configured to block movement of the coil of pipe beyond a boundary of the rectangular shaped base.

In other nonlimiting embodiments, a method for using a pipe coil skid with side rails includes: securing a coil of pipe to a pipe coil skid, the skid comprising a plurality of beams affixably connected together to form a rectangular shaped base, and a platform disposed within the base, the platform having a concave upward shape on its upward facing side when the skid sits on a horizontal surface, such that the coil of pipe positioned upon the platform contacts the platform within the base. The coil may be lifted using a pipe coil lifting device disposed on a forklift, a pipe coil lifting device secured by cable to a crane, an installation trailer for coiled pipe, or an expandable drum assembly for deploying coiled pipe. The skid may have an upward facing side generally corresponding to the outer circumferential shape of a coil of pipe. The beams and the platform are formed of a steel material and the platform may be coated with a non-stick material or a rubberized material. The pipe coil is secured to the skid using straps. The coil and skid may be secured to a rail car. The skids may be stacked. The pipe coil skid may include a first side rail coupled to at least one of the plurality of beams. The method may include blocking movement of the coil of pipe beyond a boundary of the rectangular shaped base via the first side rail.

In other nonlimiting embodiments, a side rail includes a first vertical leg that includes a first end configured to be inserted into a first slot of a pipe coil skid and a second end coupled near a first end of a horizontal restraint beam. The first vertical leg includes a first leg height greater than approximately 25 percent of a diameter of a coil of pipe positioned upon the pipe coil skid. The side rail also includes a second vertical leg that includes a first end configured to be inserted into a second slot of the pipe coil skid and a second end coupled near a second end of the horizontal restraint beam. The second vertical leg includes a second leg height greater than approximately 25 percent of the diameter of the coil of pipe, and the horizontal restraint beam includes a restraint beam length that is greater than the diameter of the coil of pipe. The side rail also includes a horizontal support beam that includes a first end coupled near the second end of the first vertical leg and a second end coupled near the second end of the second vertical leg. The horizontal support beam includes a support beam length approximately equal to a base length of the rectangular shaped base.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION

Figure 1:
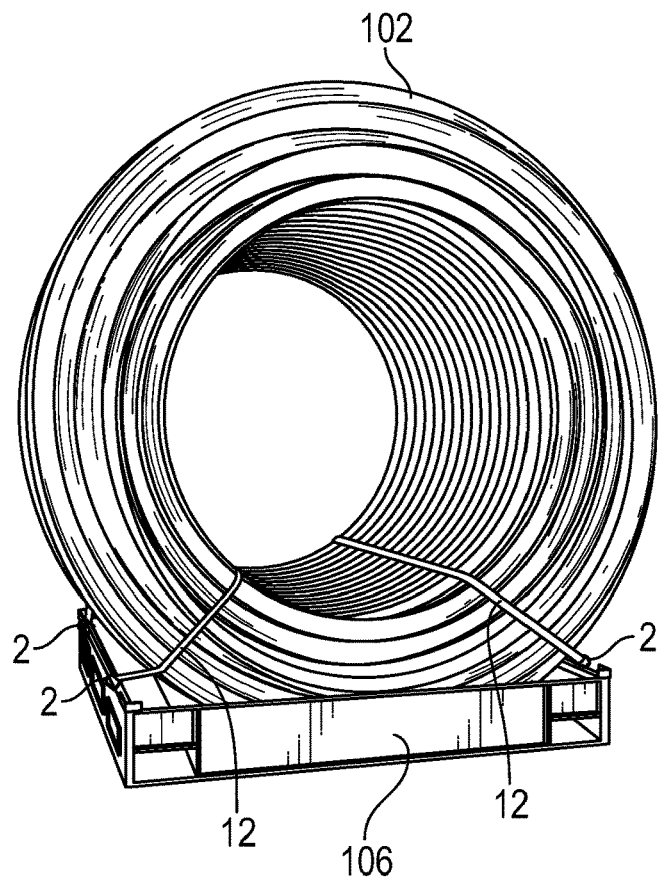
FIG. 1 is a diagram of a coil of pipe secured with straps on a pipe coil skid according to embodiments of the present disclosure.

Embodiments of the present disclosure relate generally to a pipe coil skid with side rails for use in transporting, storing and/or deploying coils of pipe. Coils of pipe may be self supported, for example, using straps or bands to hold coils together, or coils of pipe may be supported around a reel (which may be referred to as a reel of pipe).

Embodiments of the present disclosure will be described below with reference to the figures. In one aspect, embodiments disclosed herein relate to embodiments for pipe coil skids of various sizes configured for use in storage, deployment or transporting coils of flexible pipe to various sites.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

FIG. 1 shows a diagram of a coil of pipe 102 disposed on a pipe coil skid 106, the coil of pipe 102 secured by straps 12 or bands to tie-down points 2 according to embodiments of the present disclosure.

Figure 2:
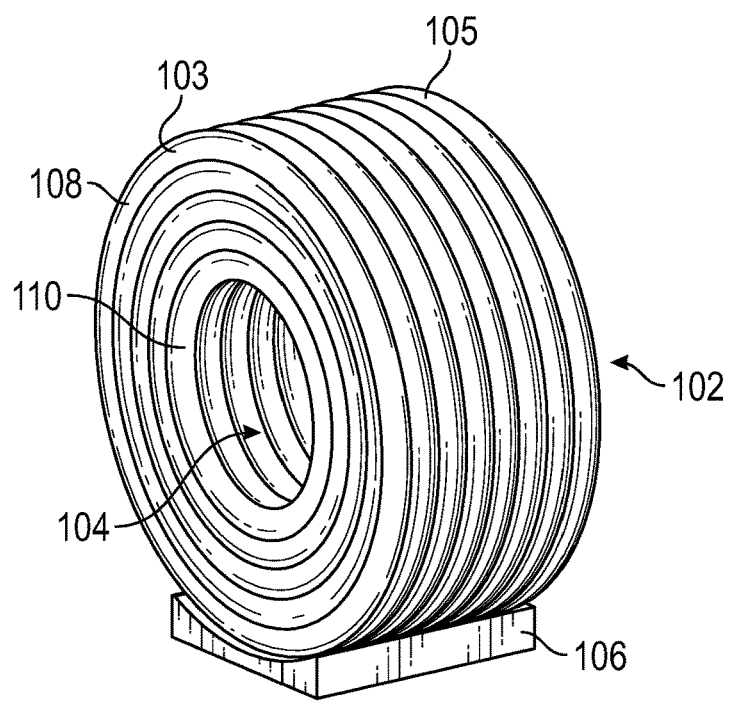
FIG. 2 is an illustration of a coil of pipe on a pipe coil skid according to embodiments of the present disclosure.

As illustrated in FIG. 2, coil of pipe 102 may be formed by wrapping pipe into a coil with an interior channel 104 formed axially therethrough, where the coil of pipe 102 may be moved as a single package or bundle of coiled pipe, as shown in FIG. 1. Each complete turn of coiled pipe may be referred to as a wrap of pipe. Multiple wraps of pipe in a coil of pipe may be configured in columns along an axial dimension of the coil of pipe and/or configured in layers along a radial dimension of the coil of pipe. For example, multiple columns of wraps may be formed along an axial direction of the coil of pipe, where the axial dimension of the coil of pipe is based on the diameter of the pipe and the number and axial position of wraps forming the coil of pipe 102. Further, multiple layers of wraps may be formed along a radial direction of the coil of pipe, where the radial dimension of the coil of pipe is based on the diameter of the pipe and the number and radial position of the wraps forming the coil of pipe.

As shown in FIG. 2, coil of pipe 102 may be one or more layers (e.g., layers 108 and 110) of pipe packaged or bundled into a larger coil. Coil of pipe 102 may include at least one or more layers of pipe that have been coiled into a particular shape or arrangement. As shown in FIG. 2, coil of pipe 102 is coiled into a substantially cylindrical shape having substantially circular bases 103 and 105 formed on each end of coil of pipe 102, where the axial dimension of coil of pipe 102 is measured between the two bases 103, 105.

A pipe, as understood by those of ordinary skill, may be a tube to convey or transfer any water, gas, oil, or any type of fluid known to those skilled in the art. The pipe used to make up coil of pipe 102 may be made of any type of materials including without limitation plastics, metals, a combination thereof, composites (e.g., fiber reinforced composites), or other materials known in the art.

In one or more embodiments, the pipe used to make up coil of pipe 102 may be a flexible type of pipe. Flexible pipe is used frequently in many applications, including without limitation, both onshore and offshore oil and gas applications. Flexible pipe may include Bonded or Unbonded Flexible Pipe, Flexible Composite Pipe (FCP), Thermoplastic Composite Pipe (TCP) or Reinforced Thermoplastic Pipe (RTP). A FCP/RTP pipe may itself be generally composed of several layers. In one or more embodiments, a flexible pipe may include a high-density polyethylene ("HDPE") liner having a reinforcement layer and an HDPE outer cover layer. Additionally, various types of polyethylene are available for flexible pipe composition. Other polymers may also be used such as nylon, PVDF, polypropylene and many others. Thus, flexible pipe may include different layers that may be made of a variety of materials and also may be treated for corrosion resistance. For example, in one or more embodiments, pipe used to make up a coil of pipe may have a corrosion protection shield layer that is disposed over another layer of steel reinforcement. In this steel reinforced layer, helically wound steel strips may be placed over a liner made of thermoplastic pipe. Flexible pipe may be designed to handle a variety of pressures, temperatures, and conveyed fluids. Further, flexible pipe may offer unique features and benefits versus steel or carbon steel pipe lines in the areas of corrosion resistance, flexibility, installation speed, and re-usability. Another type of spoolable pipe is coiled tubing.

Coiled tubing may be made of steel. Coiled tubing may also have a corrosion protection shield layer.

Coils of pipe may be made with coil having an outer diameter ranging, for example, from about 2 inches (5.1 cm) to about 10 inches (25.4 cm). However, pipe having other dimensions may be coiled to form a coil of pipe according to embodiments of the present disclosure. Accordingly, pipe that that may be spooled or coiled into coil of pipe 102 may be made to suit a number of dimensions and may have any diameter useful to a particular project.

As known to those of ordinary skill in the art, pipe used to make up coil of pipe 102 may be coiled using spoolers or other coiler machines suited for such a function. Those of ordinary skill will recognize that the present disclosure is not limited to any particular form of coiler or other device that may be used to form pipe into a coil. Coiling pipe into a coil of pipe, such as 102, assists when transporting pipe, which may be several hundred feet in length in one or more embodiments. Further, coil of pipe 102 may be assembled as a coil to facilitate deployment of the coil. Deployment, as described above and used herein, may refer to the action of unspooling or unwinding the pipe from coil of pipe 102.

After being assembled into a coil, coil of pipe 102 may include an interior channel 104 formed axially through the coil of pipe 102. Interior channel 104 is a bore disposed generally in the center of coil of pipe 102. Interior channel 104 is substantially circular shaped. The coil of pipe 102 may have an outer diameter (OD) and an inner diameter (ID), where the inner diameter is defined by the interior channel.

In one or more embodiments, coil of pipe 102 may have an outer diameter ranging from about 60 inches (1.5 m), which may occur, for example, when coil of pipe 102 has at least two layers of 2 inch pipe, to about 192 inches (4.9 m). In one or more embodiments, a coil of pipe may have an inner diameter ranging, for example, from about 84 inches (2.1 m) to about 126 inches (3.2 m). Further, in one or more embodiments, a coil of pipe may have an axial dimension (width) ranging from about 5 inches (12.7 cm) to about 92 inches (2.3 m). However, these are merely exemplary measurements. Those of ordinary skill in the art will appreciate that any range of dimensions (inner and outer diameters and width) may be accommodated using one or more embodiments.

Various illustrative embodiments of skid 106 and its related equipment and information are shown in FIGS. 1-28 herein. Skid 106 illustrated in FIGS. 1-28 may comprise a platform 4 upon which coil of pipe 102 may be disposed to hold the coil of pipe 102 in a vertical orientation. In one or more embodiments, coil of pipe 102 may be moved and secured while remaining on skid 106.

Figure 3:
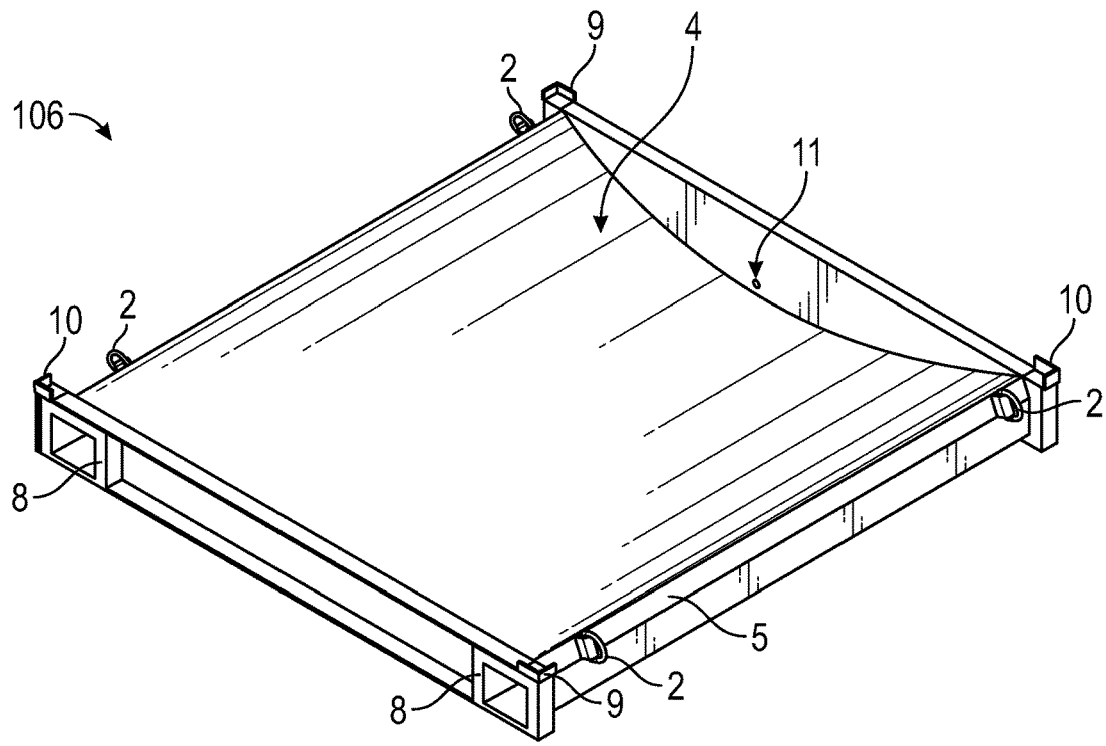
FIG. 3 illustrates a pipe coil skid according to embodiments of the present disclosure.
Figure 4:
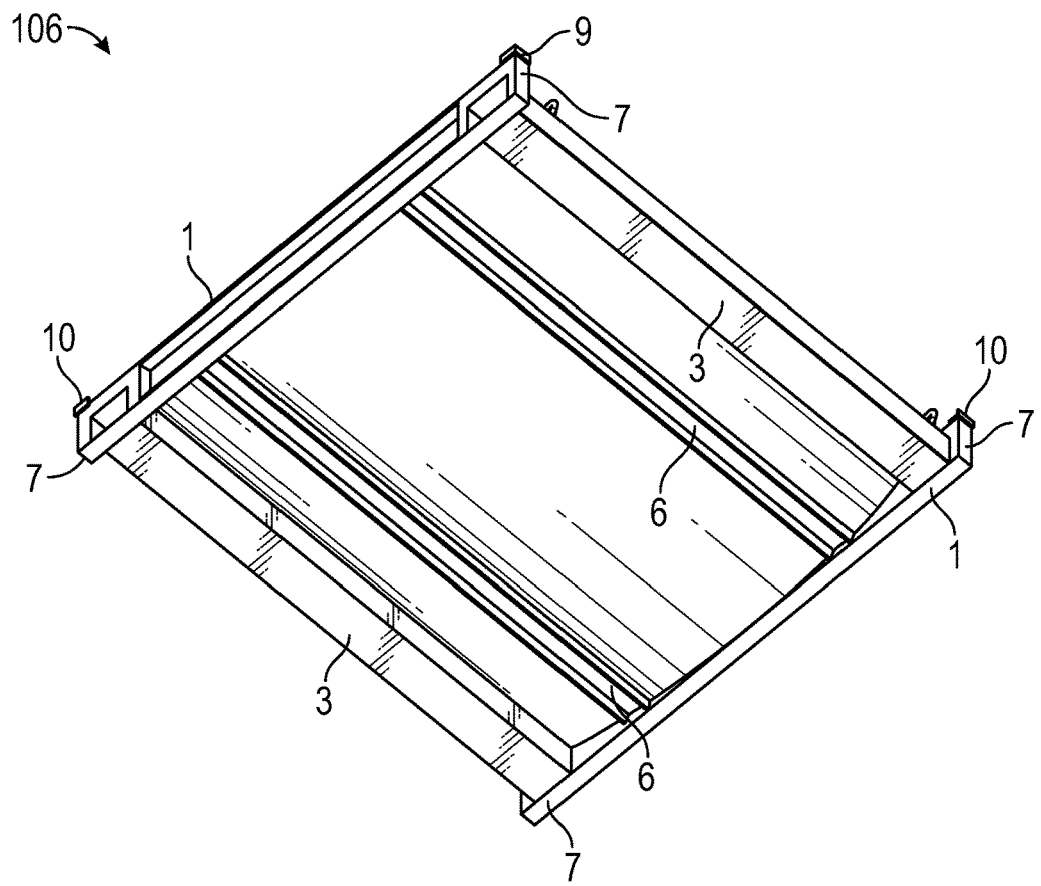
FIG. 4 illustrates a pipe coil skid according to embodiments of the present disclosure.
Figure 5:
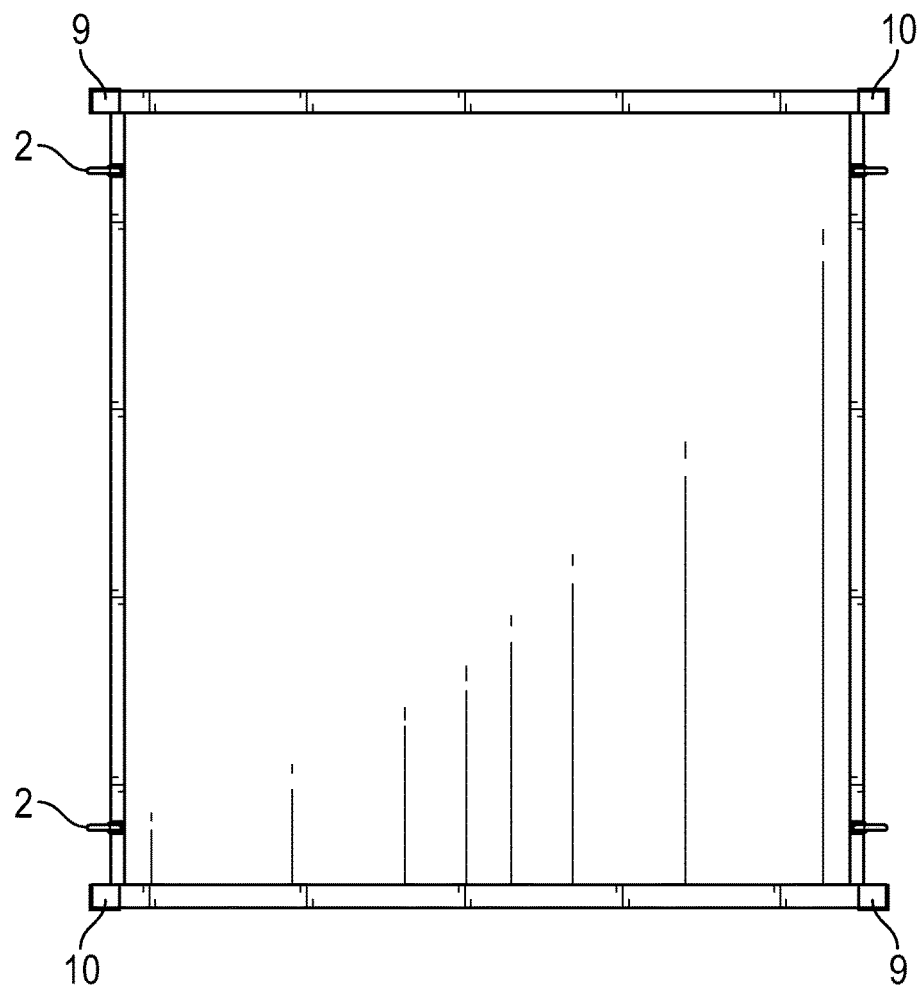
FIG. 5 illustrates aspects of a pipe coil skid according to embodiments of the present disclosure.
Figure 8:
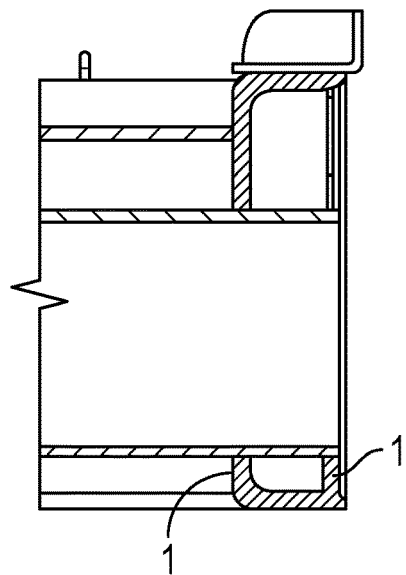
FIG. 8 illustrates aspects of a pipe coil skid according to embodiments of the present disclosure.
Figure 9:
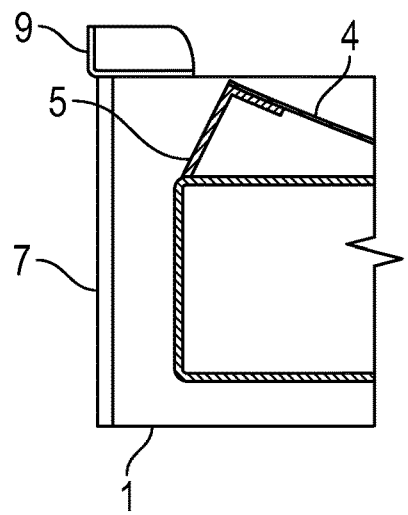
FIG. 9 illustrates aspects of a pipe coil skid according to embodiments of the present disclosure.
Figure 10:
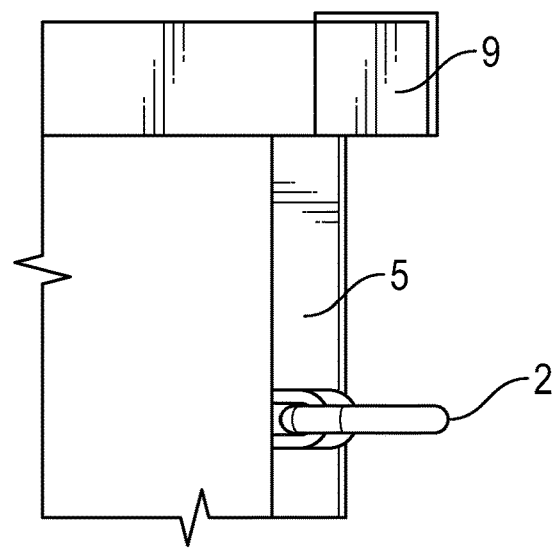
FIG. 10 illustrates aspects of a pipe coil skid according to embodiments of the present disclosure.

As illustrated in FIG. 3 and FIG. 4 according to certain illustrative embodiments, skid 106 can be formed of a plurality of beams 1, 3, 6, and 7 that are affixed together to form a rectangular shaped base. In certain illustrative embodiments, the base may be square shaped. A platform 4 sits within the base. The platform 4 can have a concave curvature shape on its upward facing side (when skid 106 sits on a horizontal surface) that generally corresponds to the outer circumferential shape of coil of pipe 102, such that when coil of pipe 102 sits within the base of the pipe coil skid 106, it is generally flush with the platform 4. However, the above description should not be deemed limiting with respect to the shape, construction, or application of skid 106, as skid 106 may have any shape, construction, and/or application that is within the scope of the description and figures herein. The pipe coil skid 106 may contain weep holes 11, for example through beam 1 as shown in FIG. 3, to aid in the removal of water from the interior of the skid 106. A cross-sectional view of beam 1 is shown in FIG. 8.

Figure 6:
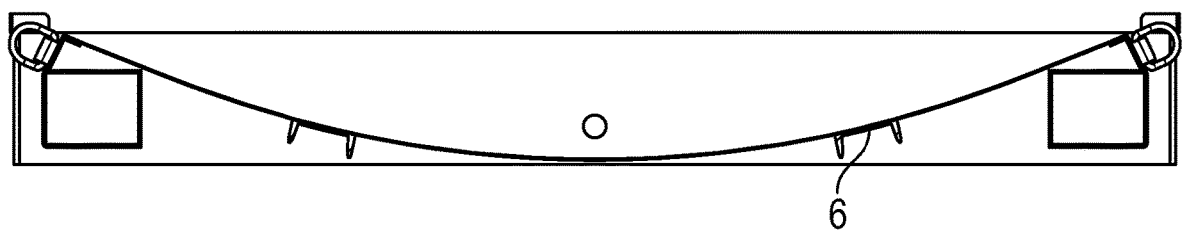
FIG. 6 illustrates aspects of a pipe coil skid according to embodiments of the present disclosure.
Figure 7:
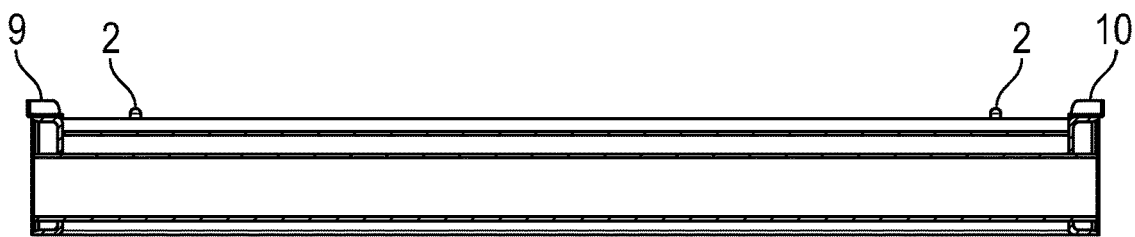
FIG. 7 illustrates aspects of a pipe coil skid according to embodiments of the present disclosure.
Figure 11:
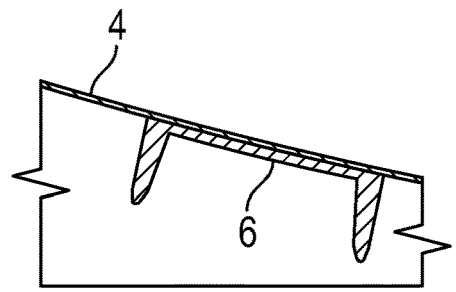
FIG. 11 illustrates aspects of a pipe coil skid according to embodiments of the present disclosure.
Figure 12:
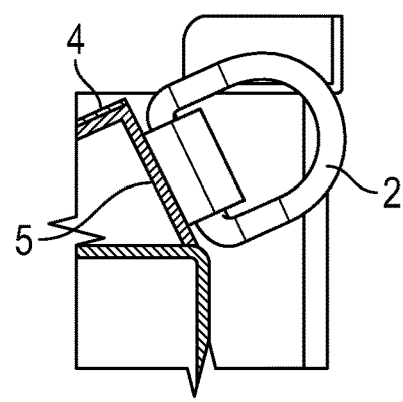
FIG. 12 illustrates aspects of a pipe coil skid according to embodiments of the present disclosure.

Additionally, as illustrated in FIG. 4 and FIG. 6, the platform 4 may have attached a plurality of u-channels 6 or u-beams as further supporting structure. Larger skids 106 may have more u-channels 6 to provide additional support of the platform 4 and coil of pipe 102. A cross section detail of this u-channel 6 structure is illustrated in FIG. 11. In certain cases, beams may be other structural shapes, for example, rectangular tube, square tube, I-beam, T-beam, or other common structural forms.

In certain illustrative embodiments, skid 106 can be formed of a metal material. For example, the metal material can be A572/GR 50 high strength, low alloy columbium vanadium structural steel. Any metal capable of supporting 40,000 lb (18,144 kg) loads may also be used including equivalent available metals such as ISO spec metal, ASTM and AISI metals.

In certain illustrative embodiments, the metal skid can be constructed of structural steel components such as c-channels, angle iron, or sheet metal that are welded together. The skid can be utilized to secure coil of pipe 102 so that it does not roll away or get damaged during storage and/or transport.

In certain illustrative embodiments, the platform and/or other parts of the metal skid can be coated with a non-stick material, and/or rubberized material, or otherwise have a non-stick surface such that coil of pipe 102 is prevented from slipping off of the skid.

In certain illustrative embodiments, skid 106 may be sized with an upward facing concave surface to support coil of pipe 102 that may have an outside diameter (OD) of about 192 inches and a weight of about 40,000 lb (18,144 kg). However, skid 106 can be sized as needed to transport different sizes and/or weights of coiled pipe.

Also with respect to FIGS. 3 and 4, skid 106 can have one or more fork pockets or channels 8 so that skid 106 can be lifted and moved with a forklift (see, e.g., FIGS. 3-4). Skid 106 may also have one or more tie-down points 2 (such as lashing rings, see FIGS. 3, 5, 7, 10 and 12) disposed thereon to secure the coiled pipe 102 to the skid 106 with, for example, straps 12 (see, e.g., FIGS. 1, 12, and 13). The tie down points 2 may be disposed on an angled surface 5 that meets platform surface 4 (see, e.g., FIG. 12). Skid 106 may also have stackable corners 9, 10 so that the skids can be stacked during transport or storage (see, e.g., FIGS. 3-10 and 16). The stackable corners 9, 10 can also be designed to fit securely within the brackets on a rail trailer so that the skid (or stack of skids) will be secured to the trailer during rail transport. Skid 106 can also be sized such that it can fit in a standard over-seas shipping container.

Figure 13:
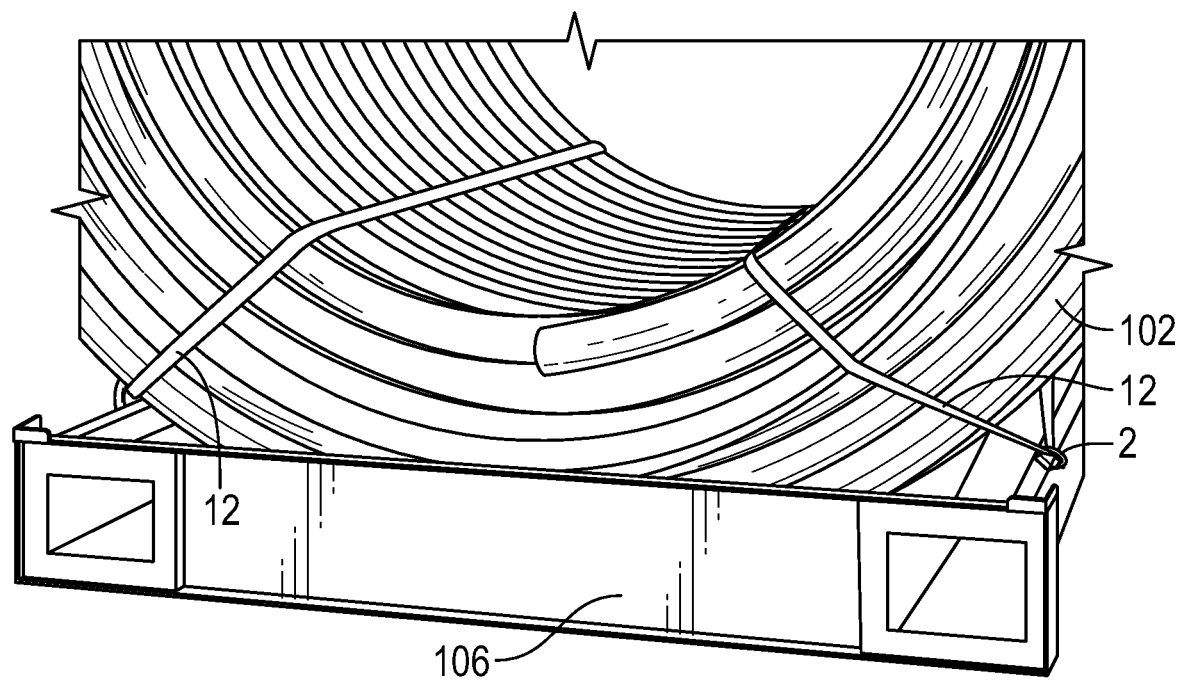
FIG. 13 illustrates aspects of a pipe coil skid according to embodiments of the present disclosure.
Figure 14:
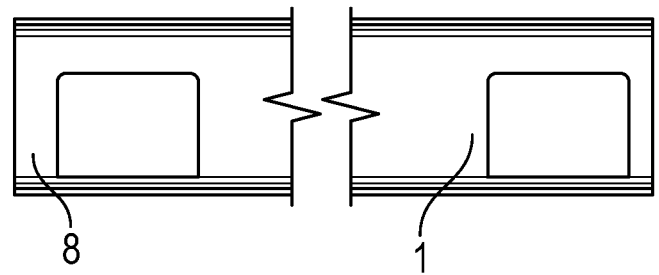
FIG. 14 illustrates aspects of a pipe coil skid according to embodiments of the present disclosure.
Figure 15:
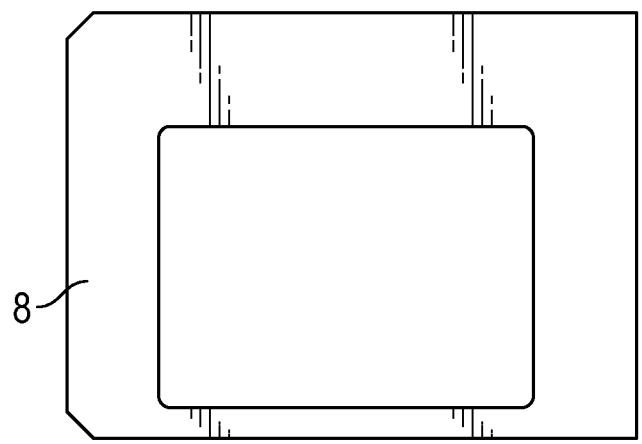
FIG. 15 illustrates aspects of a pipe coil skid according to embodiments of the present disclosure.
Figure 16:
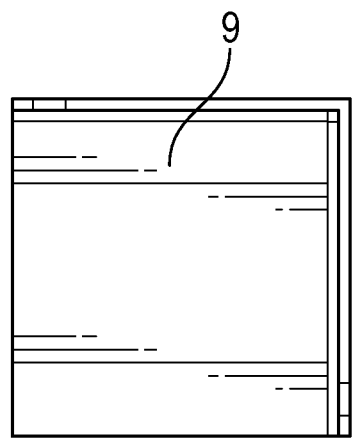
FIG. 16 illustrates aspects of a pipe coil skid according to embodiments of the present disclosure.

FIG. 13 shows pipe coil 102 secured to pipe coil skid 106 with straps 12. FIG. 1 illustrates pipe coil 102 on pipe coil skid 106. It should be appreciated that a pipe coil 102 with a pipe coil skid 106 attached may be moved using a forklift or crane that is not in contact with the pipe coil skid. At the same time, the coil 102 with skid 106 package could be lifted via skid pockets with adequately sized pocket dimensions assuming a lift with adequate weight capability is used. The design of the skid 106 may be limited due to space availability under the support surface of the skid and still ensure the overall package size fits with standard cargo containers. In certain embodiments, the pipe coil skid 106 may include various features to enable the pipe coil skid 106 to be used with various side rails as described in detail below.

Figure 17:
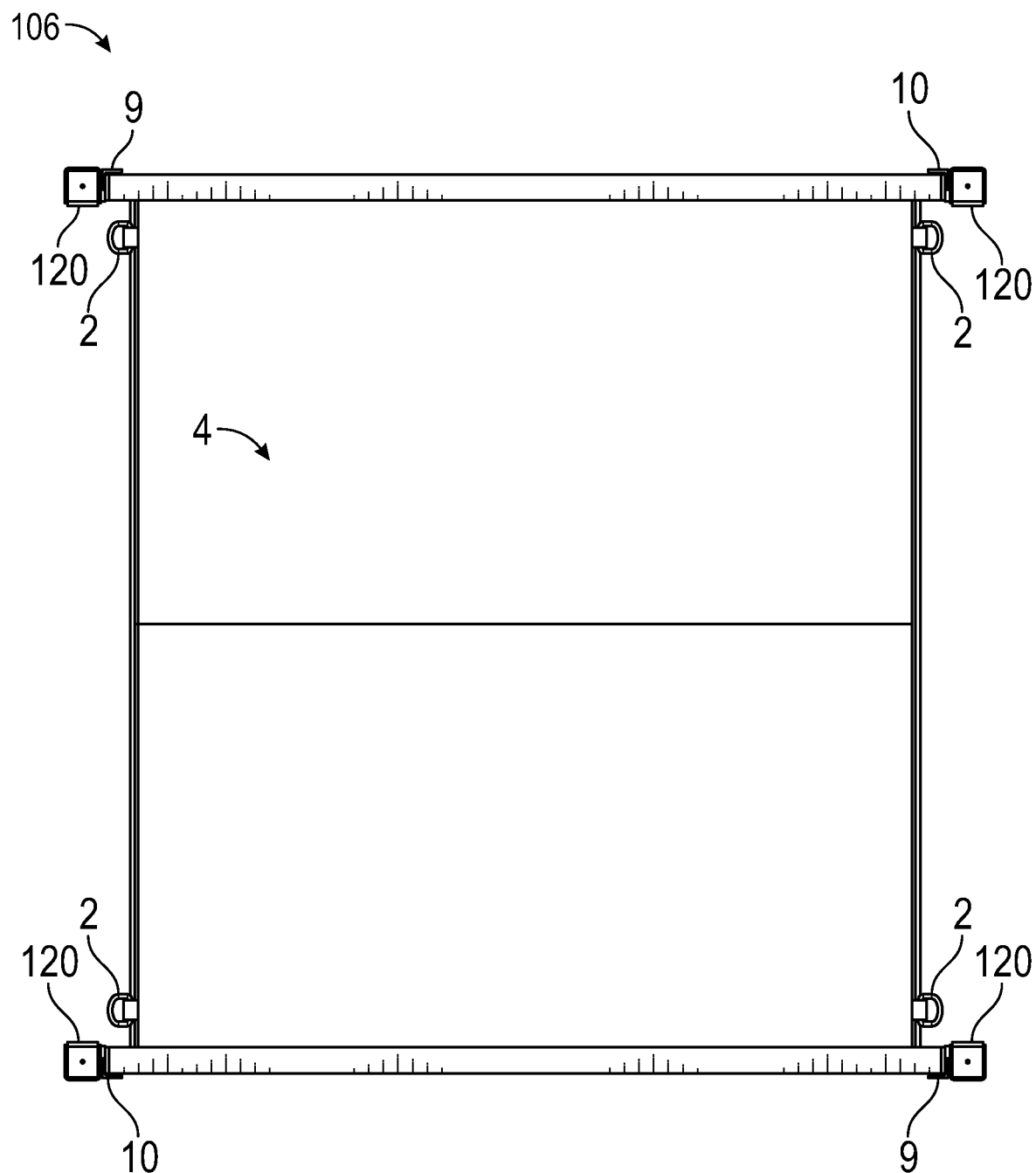
FIG. 17 illustrates aspects of a pipe coil skid to be used with side rails according to embodiments of the present disclosure.

FIG. 17 illustrates a top view of an embodiment of the pipe coil skid 106. In the illustrated embodiment, the pipe coil skid 106 includes four slots 120 coupled to the four corners of the pipe coil skid 106. In other embodiments, the slots 120 may be located at other locations, such as along sides of the pipe coil skid 106, and there may be one, two, three, five or more slots 120 depending on the configuration of the side rails described in detail below. In certain embodiments, the slots 120 may be made from steel plate bent into a tubular shape and coupled to the pipe coil skid 106 using a variety of techniques, such as welding, brazing, or threaded connectors. In some embodiments, the slots 120 may be integral components of the beams 1, 3, 6, and 7 of the pipe coil skid 106. The slots 120 may have a cross-section shape that corresponds to a square, rectangle, triangle, polygon, circle, oval, or other appropriate shape. As described below, the slots 120 may be sized to enable legs of side rails to be inserted into the slots 120. In other respects, the pipe coil skid 106 shown in FIG. 17 is similar to embodiments previously described and shown in the figures.

Figure 18:
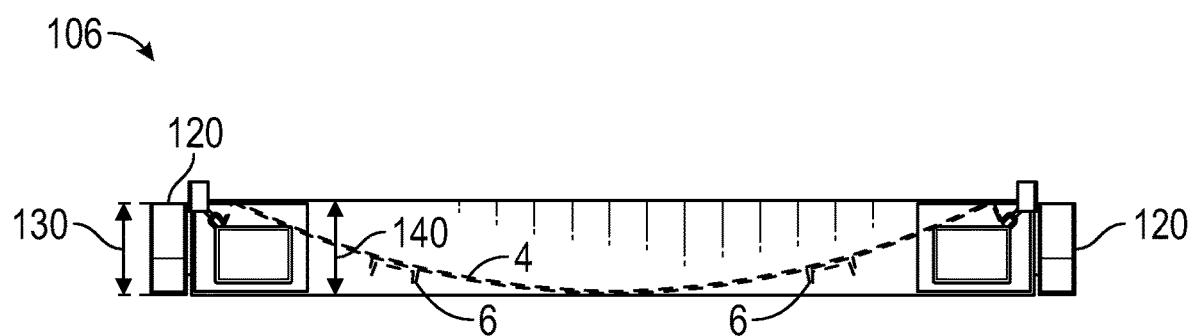
FIG. 18 illustrates aspects of a pipe coil skid to be used with side rails according to embodiments of the present disclosure.

FIG. 18 illustrates a side view of an embodiment of the pipe coil skid 106 with slots 120. As shown in FIG. 18, the slots 120 may have a height 130 approximately the same as a height 140 of the pipe coil skid 106. In other embodiments, the height 130 of the slots 120 may be less than or greater than the height 140 of the pipe coil skid 106 depending on the amount of support to be provided to the side rails.

Figure 19:
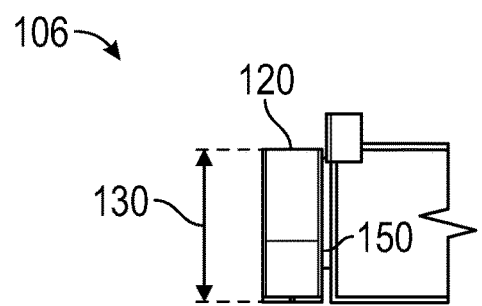
FIG. 19 illustrates aspects of a pipe coil skid to be used with side rails according to embodiments of the present disclosure.

FIG. 19 illustrates a close-up side view of an embodiment of the slots 120 coupled to the pipe coil skid 106. For example, a flat bar 150 may be coupled between the slots 120 and the pipe coil skid 106. In other embodiments, the slots 120 may be coupled directly to the pipe coil skid 106.

Figure 20:
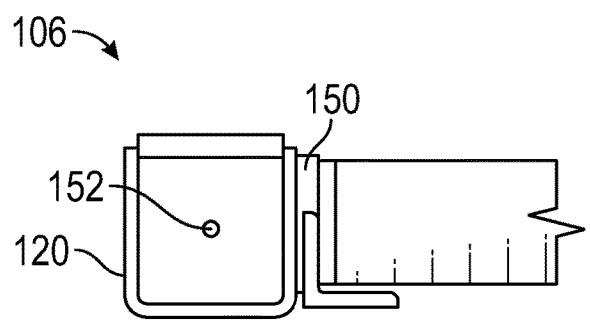
FIG. 20 illustrates aspects of a pipe coil skid to be used with side rails according to embodiments of the present disclosure.

FIG. 20 illustrates a close-up top view of an embodiment of the slots 120 coupled to the pipe coil skid 106. As shown in FIG. 20, flat bar 150 is coupled between the slot 120 and the pipe coil skid 106, although in certain embodiments, the flat bar 150 may be omitted. In certain embodiments, a weep hole 152 may be provided in the slot 120 to help prevent the buildup of rainwater or other liquids.

Figure 21:
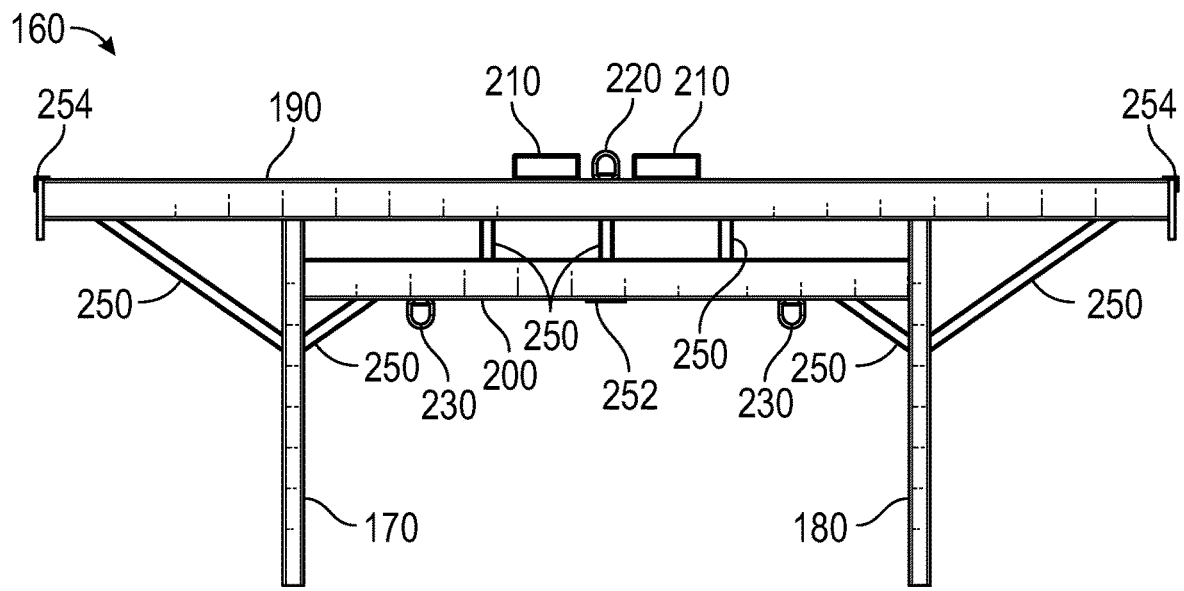
FIG. 21 illustrates aspects of a side rail to be used with a pipe coil skid according to embodiments of the present disclosure.

FIG. 21 illustrates a side view of an embodiment of a side rail 160 that may be used with the pipe coil skid 106 shown in FIGS. 17-20. In the illustrated embodiment, the side rail 160 includes a first vertical leg 170, a second vertical leg 180, a horizontal restraint beam 190, and a horizontal support beam 200 all coupled to one another to provide the structure of the side rail 160. In other embodiments, the components of the side rail 160 may be coupled together in different arrangements. For example, certain embodiments of the side rail 160 may include a different number of vertical legs, such as one, three, four or more legs. Similarly, certain embodiments of the side rail 160 may include a different number of horizontal restraint beams 190 or horizontal support beams 200. Further, although the components of the side rail 160 may be described as having vertical or horizontal orientations, it is understood that in certain embodiments, the components may be arranged at other angles with respect to the pipe coil skid 106. In addition, although the components of the side rail 160 are shown as generally straight in FIG. 21, they may have other shapes in certain embodiments. For example, the horizontal restraint beam 190 or horizontal support beam 200 may have a V-shape. The first and second vertical legs 170 and 180 may have shapes generally corresponding to those of the slots 120 to enable the first and second vertical legs 170 and 180 to be inserted into the slots 120. In certain embodiments, the first and second vertical legs 170 and 180 may be detachably coupled to the slots 120. In some embodiments, additional techniques, such as pins, may be used to secure the first and second vertical legs 170 and 180 to the slots. In other embodiments, the first and second vertical legs 170 and 180 may be coupled to the slots 120 via welding or brazing.

In certain embodiments, one or more forklift pockets 210 may be used for handling the side rail 160 and/or pipe coil skid 106 as shown in FIG. 21. In some embodiments, one or more lashing rings 220 may be used to handle or secure the side rail 160, such as via straps, cables, ropes, and so forth. In further embodiments, the side rail 160 may include one or more rings 230 or openings 240 configured to accept a chain or rope used to secure the pipe coil skid 106. The rings 230 and openings 240 may be located at any convenient locations of the side rail 160. In certain embodiments, additional supports 250 may be included to provide additional structural stability for the side rail 160. In further embodiments, the side rail 160 may include one or more tabs 252 that may be used to facilitate stacking of a plurality of side rails 160, such as when new side rails 160 are delivered or when side rails 160 are returned after being used for transportation of the pipe coil 102. The horizontal support beam 200 of one side rail 160 may contact the tab 252 of a second side rail 160 to prevent relative movement of the two side rails 160. In yet further embodiments, the side rail 160 may include one or more corners 254 that may also be used to facilitate stacking of a plurality of side rails 160. The horizontal restraint beam 190 of one side rail 160 may contact the corner 254 of a second side rail 160 to prevent relative movement of the two side rails 160. When the side rails 160 include both the tab 252 and the corners 254, a plurality of side rails 160 may be prevented from any relative movement when stacked together.

The side rail 160 may be used with the pipe coil skid 106 to block movement of the coil of pipe 102 beyond a boundary of the rectangular shaped base of the pipe coil skid 106. In other words, the side rail 160 may help contain the coil of pipe 102 within the boundary of the rectangular shaped base of the pipe coil skid 106. In some situations, the coil of pipe 102 may undergo shifting, leaning, or other movement during transportation. By having the side rail 160 in close proximity to or touching the circular bases 103 and 105, the coil of pipe 102 is blocked or prevented from moving beyond the boundary of the rectangular shaped base of the pipe coil skid 106, which may help comply with certain transportation guidelines, rules, or regulations.

Figure 22:
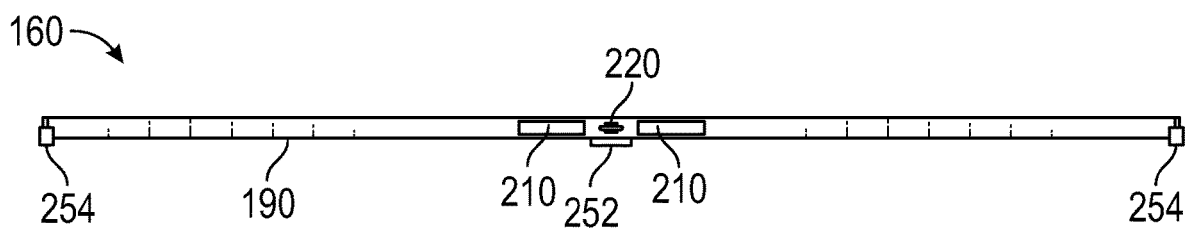
FIG. 22 illustrates aspects of a side rail to be used with a pipe coil skid according to embodiments of the present disclosure.
Figure 23:
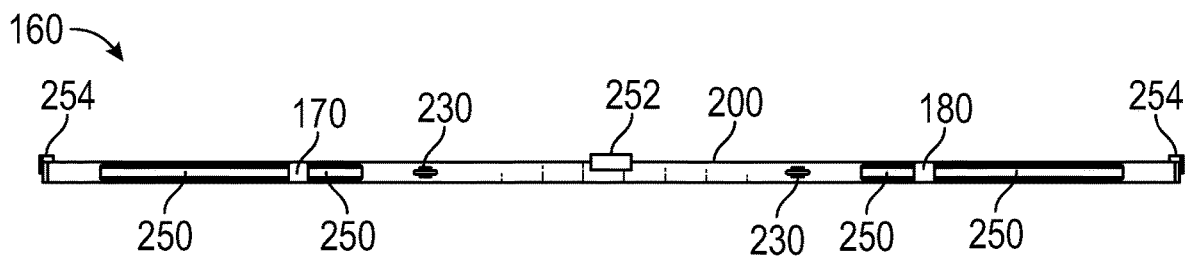
FIG. 23 illustrates aspects of a side rail to be used with a pipe coil skid according to embodiments of the present disclosure.
Figure 25:
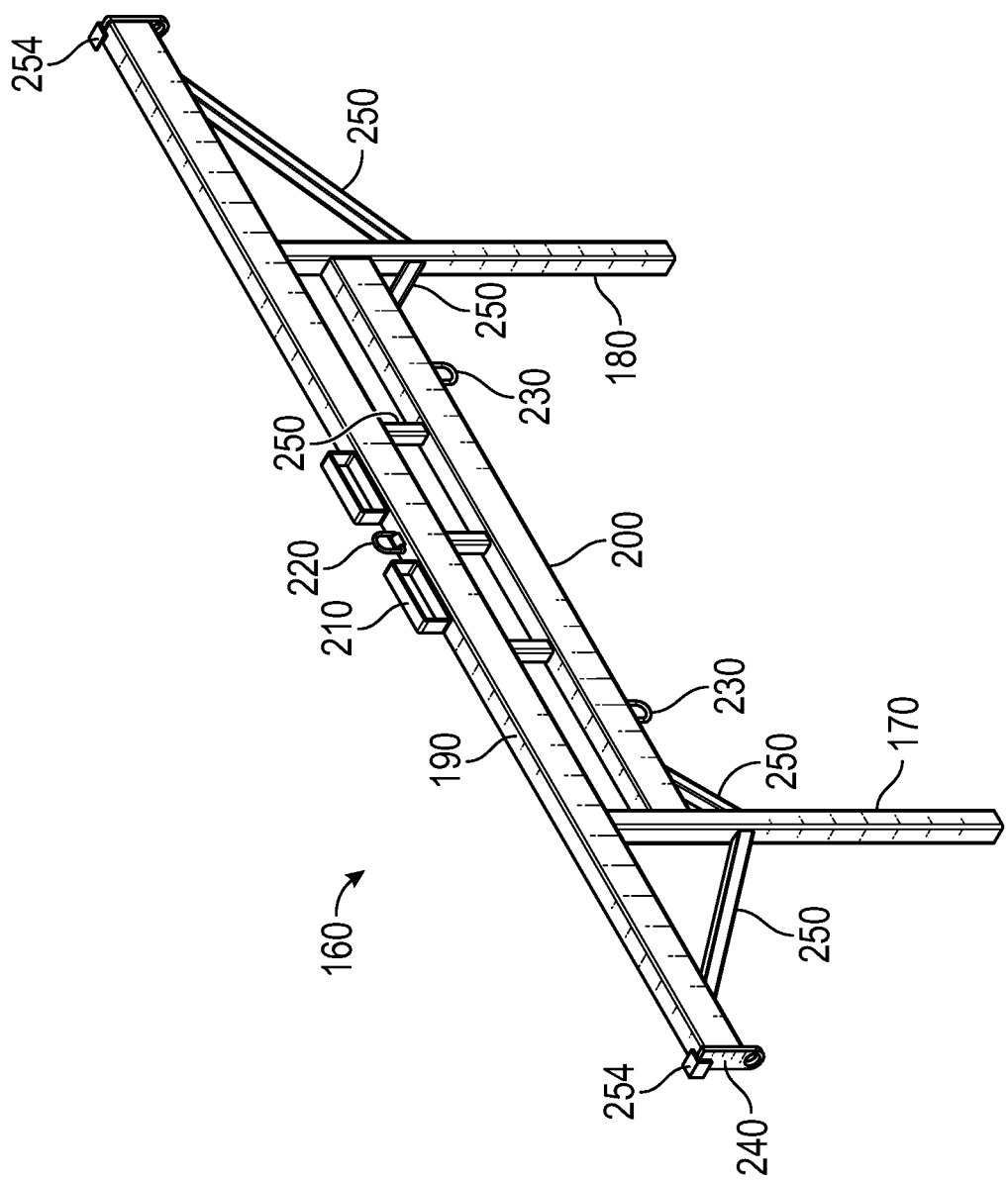
FIG. 25 illustrates aspects of a side rail to be used with a pipe coil skid according to embodiments of the present disclosure.
Figure 24:
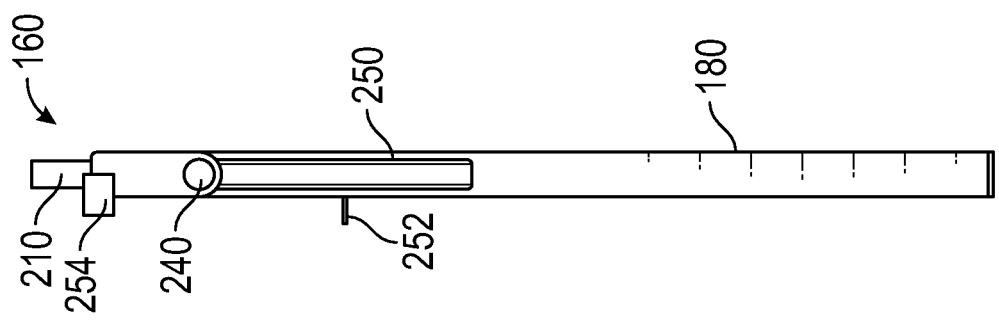
FIG. 24 illustrates aspects of a side rail to be used with a pipe coil skid according to embodiments of the present disclosure.

FIG. 22 illustrates a top view of the embodiment of the side rail 160 shown in FIG. 21. FIG. 23 illustrates a bottom view of the embodiment of the side rail 160 shown in FIG. 21. FIG. 24 illustrates a front view of the embodiment of the side rail 160 shown in FIG. 21. Finally, FIG. 25 illustrates a perspective view of the embodiment of the side rail 160 shown in FIG. 21. Elements in common with those shown in FIG. 21 are labeled with the same reference numerals in FIGS. 22-25.

Figure 26:
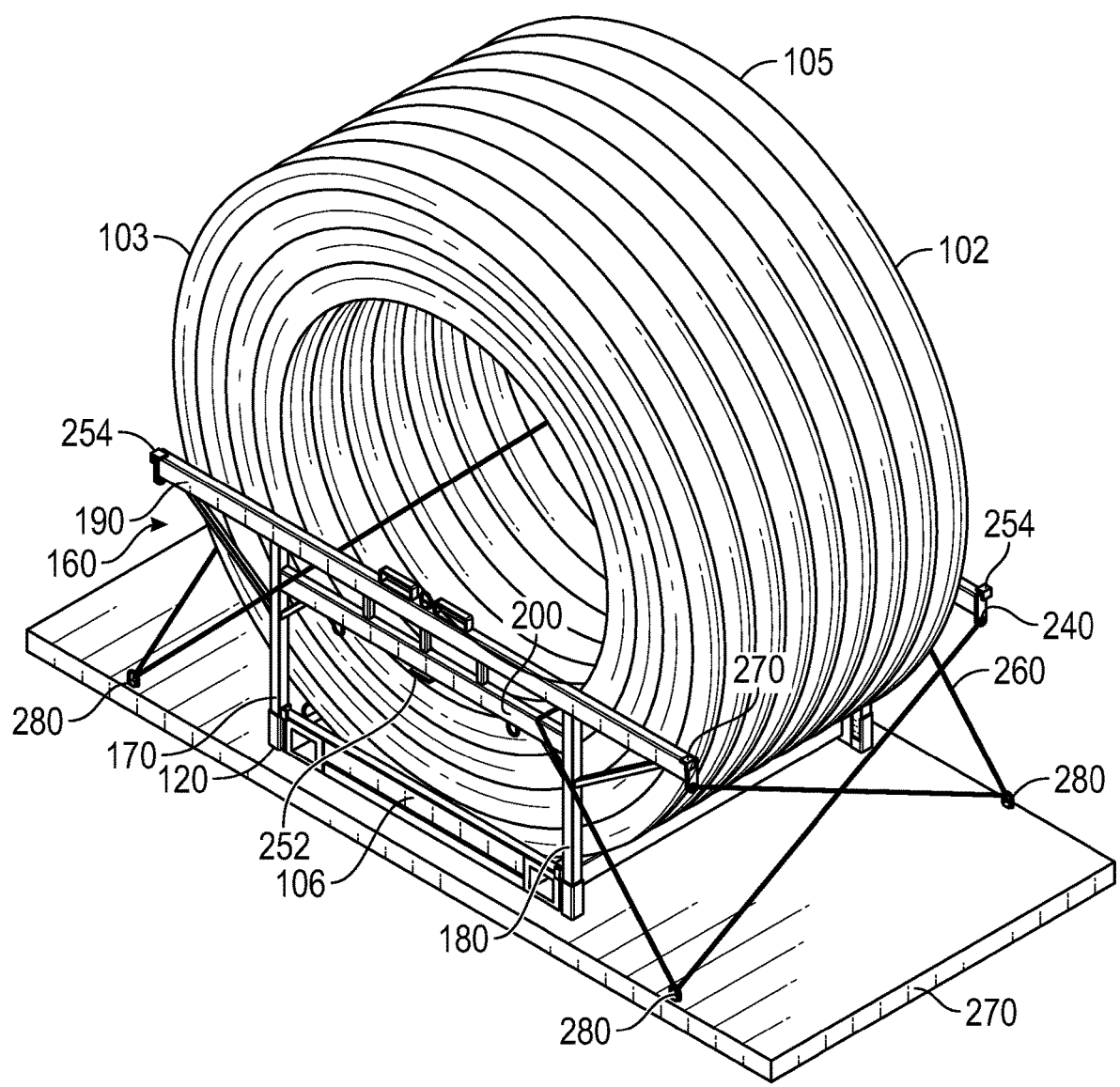
FIG. 26 illustrates aspects of a pipe coil skid with side rails according to embodiments of the present disclosure.

FIG. 26 illustrates a perspective view of an embodiment of the pipe coil skid 106, side rail 160, and coil of pipe 102. As shown in FIG. 26, two side rails 160 are located at the sides of the pipe coil skid 106 forming a space therebetween where the coil of pipe 102 is located. In the illustrated embodiment, one or more chains 260 are used to secure the side rail 160 to a rail car 270 or other transportation platform, such as a truck or deck of a vessel or ship. As shown in FIG. 26, the chains 260 may pass through the openings 240 or through other portions of the side rail 160 to secure the side rail 160 to tie-down points 280 of the rail car 270. For example, portions of the chains 260 may rest against the first vertical leg 170, second vertical leg 180, horizontal restraint beam 190, horizontal support beam 200, or other portions of the side rail 160. As shown in FIG. 26, the horizontal restraint beam 190 of the first side rail 160 may contact the circular base 103 of the coil of pipe 102 to block movement of the coil of pipe 102 beyond the boundary of the pipe coil skid 106. Similarly, the horizontal restraint beam 190 of the second side rail 160 may contact the circular base 105 of the coil of pipe 102 to block movement of the coil of pipe 102 beyond the boundary of the pipe coil skid 106. Thus, the coil of pipe 102 (i.e., one or more layers 108, 110 of the coil of pipe 102) is prevented from extending beyond the boundary of the pipe coil skid 106, such as by leaning to one side. This may help prevent any part of the coil of pipe 102 from contacting objects located beyond the rail car 270 during transportation. In certain embodiments, coil-contacting components, such as blocks of plastic of foam, may be added to the inner surfaces of the horizontal restraint beams 190 to prevent any potential damage to the coil of pipe 102 during transportation.

Figure 27:
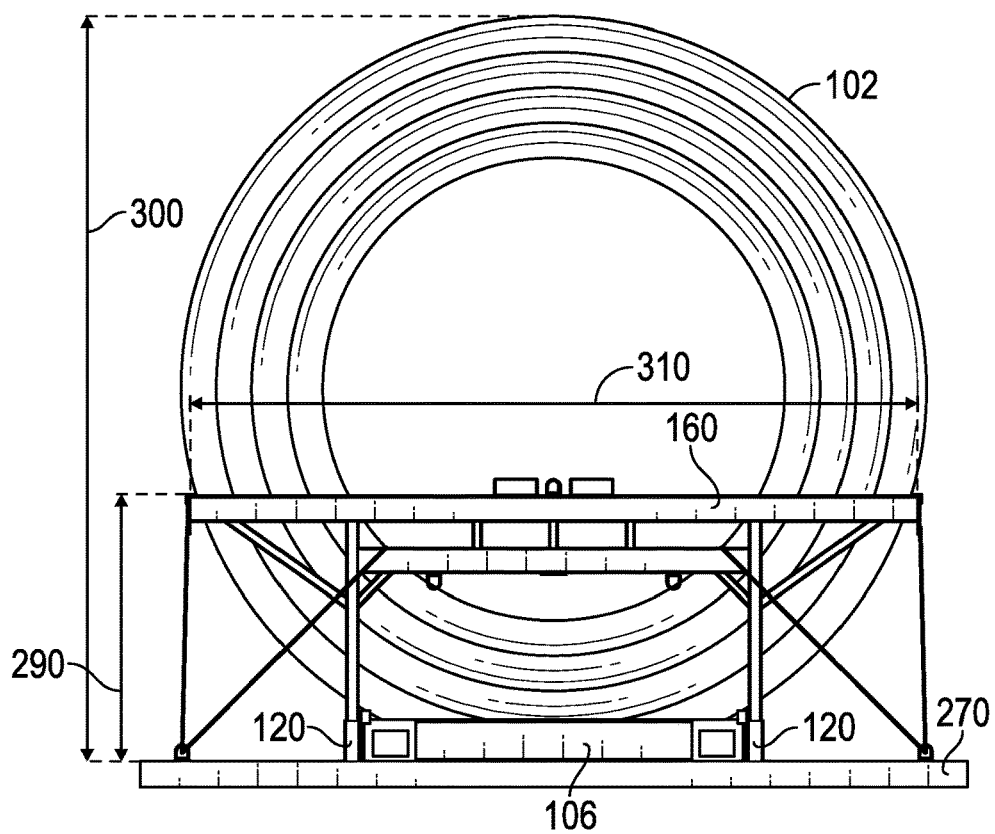
FIG. 27 illustrates aspects of a pipe coil skid with side rails according to embodiments of the present disclosure.

FIG. 27 illustrates a side view of an embodiment of the pipe coil skid 106, side rail 160, and coil of pipe 102. As shown in FIG. 27, the side rail has a rail height 290 that is greater than approximately 25 percent of a diameter 300 of the coil of pipe 102. In addition, the side rail 150 has a rail length 310 that is approximately equal to or greater than the diameter 300 of the coil of pipe 102. By providing the side rail 160 with the rail height 290 and rail length 310, the side rail 160 may have enough support area to block movement of the coil of pipe 102 beyond a boundary of the rectangular shaped base of the pipe coil skid 106. In further embodiments, the rail height 290 may be greater than approximately 30, 40, 50, 60, or 70 percent of the diameter 300. In yet further embodiments, the rail length 310 may be less than the diameter 300 when the rail height 290 is tall enough to provide sufficient support area to block movement of the coil of pipe 102 beyond a boundary of the rectangular shaped base of the pipe coil skid 106.

Figure 28:
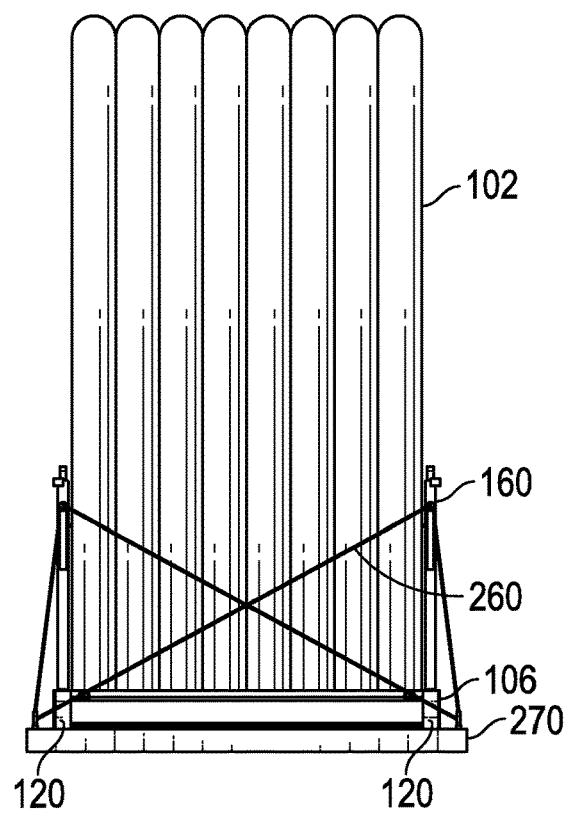
FIG. 28 illustrates aspects of a pipe coil skid with side rails according to embodiments of the present disclosure.

FIG. 28 illustrates a front view of an embodiment of the pipe coil skid 106, side rail 160, and coil of pipe 102. As shown in FIG. 28, the chains 260 may cross over one another to provide additional stability when securing the side rail 160 to the rail car 270. In addition, it can be seen in FIG. 28 how the side rails 160 physically block movement of the coil of pipe 102 beyond a boundary of the pipe coil skid 106. Further, although one arrangement of chains 260 is shown in the figures, it is anticipated that the coil of pipe 102 can be secured using a variety of different arrangements of chains 260 or using other shipping materials, such as straps, ropes, and so forth.

Numerous benefits and advantages may be provided as a result of the one or more embodiments of a steel pipe coil skid 106 as described in the present disclosure. For example, in certain illustrative embodiments, skid 106 can have a size, shape and construction that is acceptable by freight railroad transportation providers to safely handle the 2 g and 3 g loading requirements for shipping large, heavy items on the rail. Skid 106 having a metal construction is especially suited for transporting the coil of pipe 102 by rail. Prior art skid designs made of wood could not be transported by rail because they could not meet these 2 g lateral and 3 g longitudinal loading requirements. In addition, while rail transportation often requires hardwood construction of transportation skids, which is costly, the metal fabricated design is overall cheaper and stronger.

For example, when a reel is not utilized, i.e., reel-less pipe, the coil of pipe 102 can include a very long length of wound piping and be heavier (and longer) than reeled pipe. Certain customers may desire that pipe 102 not be coiled onto a reel because reels must then be stored and/or returned to the supplier after the pipe 102 is removed. Skid 106 may also be transported by truck, train or ship, if desired. Thus, skid 106 is multi-modal in certain illustrative embodiments.

In certain illustrative embodiments, one or more brackets can be utilized on or near the rails of the railcar to further secure skid 106 to the railcar. In certain illustrative embodiments, the brackets can be positioned on both sides of skid 106 to provide support on each side, and pressed tightly against skid 106 such that movement of skid 106 is restricted. The brackets can have a length that is the same length as, or substantially the same length as, the skid, or alternatively, one or more shorter brackets can be utilized along the length of the skid.

In one nonlimiting embodiment a pipe coil skid with side rails includes a plurality of beams affixably connected together to form a rectangular shaped base with a platform disposed within the base, the platform having a concave upward shape on its upward facing side when the skid sits on a horizontal surface such that the coil of pipe positioned upon the platform contacts the platform within the base. In other aspects, the pipe coil skid has an upward facing side generally corresponding to the outer circumferential shape of a coil of pipe. The beams and the platform may be formed of a steel material. The platform may be coated with a non-stick material or a rubberized material. The pipe coil skid may have a plurality of tie-down points for securing the coil of pipe. The pipe coil skid may have stackable corners disposed on the skids to enable stacking of pipe coil skids. The pipe coil skid may contain weep holes to aid in the disposal of moisture. The pipe coil skid may include side rails that detachably couple to the pipe coil skid and are configured to block side-to-side movement of the coils.

In another embodiment, a method for using a pipe coil skid with side rails provides for securing a coil of pipe to a pipe coil skid. The skid comprises a plurality of beams affixably connected together to form a rectangular shaped base, and a platform disposed within the base, the platform having a concave upward shape on its upward facing side when the skid sits on a horizontal surface, such that the coil of pipe positioned upon the platform contacts the platform within the base. The pipe coil skid may include side rails that detachably couple to the pipe coil skid and are configured to block side-to-side movement of the coils.

Other aspects of the method include lifting the coil of flexible pipe with a pipe coil lifting device using a forklift or a crane. The pipe coil skid secured to the pipe coil may have an upward facing side generally corresponding to the outer circumferential shape of a coil of pipe. The beams and the platform of the pipe coil skid are formed of a steel material. The platform may coated with a non-stick material or a rubberized material. The method may include securing the pipe coil to the skid using straps. The method may further include securing the pipe coil skid to a rail car. The pipe coil skid may include side rails that detachably couple to the pipe coil skid and are configured to block side-to-side movement of the coils.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system, comprising:
a coil of pipe; and
a pipe coil skid, wherein the pipe coil skid comprises:
a plurality of beams affixably connected together to form a rectangular shaped base;
a platform disposed within the rectangular shaped base, wherein the platform comprises a concave upward facing side when the pipe coil skid sits on a horizontal surface to enable the coil of pipe to contact the platform within the rectangular shaped base; and
a first side rail configured to be coupled to a first side of the rectangular shaped base to facilitate blocking movement of the coil of pipe beyond a boundary of the rectangular shaped base, wherein the first side rail comprises:
a first vertical leg configured to be coupled to the rectangular shaped base;
a second vertical leg configured to be coupled to the rectangular shaped base; and
a horizontal restraint beam secured to a first upper end of the first vertical leg and a second upper end of the second vertical leg such that the horizontal restraint beam extends horizontally beyond the first vertical leg and the second vertical leg.

2. The system of claim 1, wherein the pipe coil skid comprises a second side rail configured to be coupled to a second side of the rectangular shaped base opposite the first side rail to facilitate blocking movement of the coil of pipe beyond the boundary of the rectangular shaped base.

3. The system of claim 1, wherein the pipe coil skid comprises:
a first slot secured to the rectangular shaped base via a first flat bar, wherein a first lower end of the first vertical leg of the first side rail is configured to be disposed within the first slot; and
a second slot secured to the rectangular shaped base via a second flat bar, wherein a second lower end of the second vertical leg of the first side rail is configured to be disposed within the second slot.

4. The system of claim 3, wherein:
the first slot of the pipe coil skid comprises a first weep hole configured to enable liquid to drain out from the first slot; and
the second slot of the pipe coil skid comprises a second weep hole configured to enable liquid to drain out from the second slot.

5. The system of claim 1, wherein the pipe coil skid comprises a weep hole formed through the plurality of beams to facilitate draining out liquid from the pipe coil skid.

6. The system of claim 1, wherein the first side rail comprises a forklift pocket secured to the horizontal restraint beam, wherein the forklift pocket is configured to accept a forklift tine of a forklift to facilitate handling the first side rail via the forklift.

7. The system of claim 1, comprising:
a pipe transportation vehicle, wherein the pipe transportation vehicle comprises a transportation platform; and
a chain configured to be inserted through the first side rail, through an interior channel of the coil of pipe, and through a tie-down ring on the transportation platform to facilitate securing the pipe coil skid and the coil of pipe on the pipe transportation vehicle.

8. The system of claim 1, comprising a pipe transportation vehicle, wherein:
the pipe transportation vehicle comprises a bracket; and
the pipe coil skid comprises a stackable corner secured to the rectangular shaped base, wherein the stackable corner is configured to fit securely within the bracket on the pipe transportation vehicle to facilitate securing the pipe coil skid to the pipe transportation vehicle.

9. The system of claim 1, wherein:
the first side rail comprises a horizontal support beam secured between the first vertical leg and the second vertical leg below the horizontal restraint beam, wherein the horizontal support beam comprises a support beam length that is shorter than a restraint beam length of the horizontal restraint beam; and
the horizontal restraint beam is secured to the first upper end of the first vertical leg and the second upper end of the second vertical leg such that the horizontal restraint beam extends horizontally beyond the rectangular shaped base.

10. A method for using a pipe coil skid comprising:
disposing a coil of pipe on the pipe coil skid, wherein the pipe coil skid comprises:
a plurality of beams affixably connected together to form a rectangular shaped base;
a platform disposed within the rectangular shaped base, wherein the platform comprises a concave upward facing side when the pipe coil skid sits on a horizontal surface to enable the coil of pipe to contact the platform within the rectangular shaped base; and
a side rail coupled to a side of the rectangular shaped base, wherein the side rail comprises:
a first vertical leg coupled to the rectangular shaped base;
a second vertical leg coupled to the rectangular shaped base; and
a horizontal restraint beam secured to a first upper end of the first vertical leg and a second upper end of the second vertical leg such that the horizontal restraint beam extends horizontally beyond the rectangular shaped base; and
blocking movement of the coil of pipe beyond a boundary of the rectangular shaped base using at least the side rail.

11. The method of claim 10, wherein:
the side rail comprises a horizontal support beam secured between the first vertical leg and the second vertical leg below the horizontal restraint beam, wherein the horizontal support beam comprises a support beam length that is shorter than a restraint beam length of the horizontal restraint beam; and
the horizontal restraint beam is secured to the first upper end of the first vertical leg and the second upper end of the second vertical leg such that the horizontal restraint beam extends horizontally beyond the first vertical leg and the second vertical leg.

12. The method of claim 10, comprising securing the pipe coil skid to a pipe transportation vehicle, wherein:
the pipe transportation vehicle comprises a bracket;
the pipe coil skid comprises a stackable corner secured to the rectangular shaped base; and
securing the pipe coil skid to the pipe transportation vehicle comprises securely fitting the stackable corner of the pipe coil skid within the bracket on the pipe transportation vehicle.

13. The method of claim 10, comprising securing the pipe coil skid and the coil of pipe on a transportation platform at least in part by inserting a chain through the side rail, through an interior channel of the coil of pipe, and through a tie-down ring on the transportation platform.

14. A system comprising a side rail configured to be coupled to a rectangular shaped base of a pipe coil skid, wherein the side rail comprises:
   a first vertical leg, wherein the first vertical leg comprises a first lower end configured to be inserted into a first slot that is secured to the rectangular shaped base of the pipe coil skid to facilitate coupling the side rail to the rectangular shaped base of the pipe coil skid;
   a second vertical leg, wherein the second vertical leg comprises a second lower end configured to be inserted into a second slot that is secured to the rectangular shaped base of the pipe coil skid to facilitate coupling the side rail to the rectangular shaped base of the pipe coil skid;
   a horizontal support beam secured between the first vertical leg and the second vertical leg; and
   a horizontal restraint beam secured to a first upper end of the first vertical leg and a second upper end of the second vertical leg above the horizontal support beam, wherein the horizontal restraint beam comprises a restraint beam length that is longer than a support beam length of the horizontal support beam.

15. The system of claim 14, wherein the horizontal restraint beam is secured to the first upper end of the first vertical leg and the second upper end of the second vertical leg such that:
   the horizontal restraint beam extends horizontally beyond the first vertical leg and the second vertical leg; and
   the horizontal restraint beam extends horizontally beyond the rectangular shaped base of the pipe coil skid.

16. The system of claim 14, wherein the side rail comprises:
   one or more vertical support beams secured between the horizontal restraint beam and the horizontal support beam;
   a first slanted support beam secured between the first vertical leg and the horizontal restraint beam; and
   a second slanted support beam secured between the second vertical leg and the horizontal restraint beam.

17. The system of claim 14, wherein the side rail comprises a lash ring secured to the horizontal restraint beam or the horizontal restraint beam to enable a chain to be inserted through the side rail.

18. The system of claim 14, comprising:
   a coil of pipe configured to be disposed on the pipe coil skid;
   a pipe transportation vehicle, wherein the pipe transportation vehicle comprises a transportation platform; and
   a chain configured to be inserted through the side rail, through an interior channel of the coil of pipe, and through a tie-down ring on the transportation platform to facilitate securing the pipe coil skid and the coil of pipe on the pipe transportation vehicle.

19. The system of claim 14, wherein the side rail comprises a forklift pocket secured to the horizontal support beam, wherein the forklift pocket is configured to accept a forklift tine of a forklift to facilitate handling the side rail via the forklift.

20. The system of claim 14, wherein the side rail comprises:
   a corner secured to an end of the horizontal restraint beam, wherein the corner of the side rail is configured to interface with another corner of another side rail when the side rail and the another side rail are stacked on top of one another to facilitate blocking relative movement between the side rail and the another side rail; and
   a tab secured to the horizontal support beam, wherein the tab is configured to interface with another horizontal support beam of the another side rail when the side rail and the another side rail are stacked on top of one another to facilitate blocking relative movement between the side rail and the another side rail.

* * * * *